Patented Nov. 24, 1942

2,303,284

UNITED STATES PATENT OFFICE 2,303,284

ABRASIVE GRAIN

Abraham Albert Klein, Worcester, Mass., assignor to Norton Company, Worcester, Mass., a corporation of Massachusetts No Drawing. Application June 26, 1940,
Serial No. 342,441

4 Claims. (Cl. 51—308)

The invention relates to abrasive grain.

One object of the invention is to provide loose grain for set-up wheels of greater durability. Another object of the invention is to make a more efficient set-up wheel. Another object of the invention is to provide abrasive grain for set-up polishing wheels which will give a better rate of cut as measured by M. R./W. W. and also (M. R.)$^2$/W. W., where M. R. is material removed and W. W. is wheel wear. Another object of the invention is to provide a superior grit for abrasive coated products. Other objects will be in part obvious or in part pointed out hereinafter.

The invention accordingly consists in the features of construction, combinations of elements, and arrangements of parts, and in the several steps and relation and order of each of said steps to one or more of the others thereof, all as will be illustratively described herein, and the scope of the application of which will be indicated in the following claims.

Fused alumina $Al_2O_3$ is commonly used in grain form for the coating of set-up wheels to grind such implements as hardware including small tools, bumper bars for automobiles, also automobile bodies and fenders, agricultural implements and the like. Set-up wheels may be of many different forms, but often consist of discs of cloth held together by a central spindle and washers, the peripheries of the discs being coated with glue or some prepared cement upon which the abrasive grain is sprinkled. The present invention involves improved aluminous abrasive grain for use as above indicated and also from which to manufacture sandpaper and abrasive cloth.

By the expression "aluminous abrasive" or "alumina" I include the product of the electric furnace which is mainly crystalline $Al_2O_3$ in various degrees of purity including the porous as well as the dense product, also emery which is largely $Al_2O_3$, corundum which is a natural alumina of high purity, and similar materials the major part of which is alumina of the formula $Al_2O_3$.

Considering now the preparation of the new improved product, I may proceed according to the following examples:

Example I

Four hundred pounds of 36 grit size regular brand dense alumina and two and one-half pounds of water and seven-eighths of a pound of commercial sodium silicate are placed in a mixer and mixed for five minutes. Then eight pounds and three ounces of cryolite, which is a double sodium aluminum fluoride, is added to the mixer and mixing is continued for ten minutes more. The resulting product is placed in cans and heated in a kiln at 475° C. for one week. The product is screened and is then ready for sale.

Example II

Four hundred pounds of 100 grit size of regular brand alumina, eleven pounds and four ounces of cryolite, and two pounds and twelve ounces of bentonite, a colloidal clay, are placed in a mixer and mixed for from three to five minutes. Eleven pounds of water and one and a quarter pounds of commercial sodium silicate are first mixed together and then slowly added to the mixer. Mixing is continued until the entire mix is plastic, which condition usually is achieved at the end of 15 to 30 minutes. The resulting product is then placed in cans and heated in a kiln at 475° C. for one week, after which it is screened and is then ready for sale.

In each example the sodium silicate was of the formula $1Na_2O+3SiO_2+45\%$ (on the whole) $H_2O$. Cryolite is considered to be $Na_3AlF_6$ or $3NaF.AlF_3$ and is found in Greenland. Other fluorides having similar properties, insoluble in water, such as calcium fluoride, or apatite may be used.

The object of the foregoing is to coat the alumina grains with cryolite. The cryolite should be finely divided; in the case of Example I it may be 200 grit size and finer, and in the case of Example II it may be 400 grit size and finer. I have found that the best results are achieved by holding a coating upon the alumina grains of between one-half of one per cent and one and one-half per cent by weight of the cryolite. The method of mixing given in Example II is more efficient in coating the grain with cryolite; if too much cryolite is found upon the grain, the amount thereof placed in a mixer should be reduced. It is comparatively simple to test the final product for fluorine and then calculate the quantity of cryolite in a given batch of the completed grain, and if too much is found to be present the amount of cryolite introduced into the mixer can be reduced.

The method of Example I is preferred for grit sizes of 90 and coarser. The method of Example II is preferred for grit sizes of 100 and finer. The number of a grit size refers to the meshes per linear inch of screens used to select the abrasive grain of that size, as is well known in the art.

As an example of the utility of the invention, the following results are given: In the polishing of Rockwell B82 steel, a manufacturer used sewed and glued canvas set-up wheels 16" x 2½" operating at 7500 surface feet per minute. The manufacturer had been using the best grade of fused alumina for the purpose which consisted of alumina grain treated according to U. S. Patent No. 944,436. Upon changing to grain coated according to the present invention, I found that the wheel wear per minute was from 55% to 61% of the wheel wear obtained with the aforesaid best grade of fused alumina, while the material removed was between 6% and 17% less, using the grain according to the present invention, than theretofore. The best grade of fused alumina which the manufacturer previously used, as above stated, will be designated A. Grain according to the present invention will be designated B. Material removed and wheel wear will be given the values 100 for the A grain. Accordingly we find the following results:

$$A \quad \frac{M.\ R.}{W.\ W.} = \frac{100}{100} = 1$$

$$B \quad \frac{M.\ R.}{W.\ W.} = \frac{83}{55} = 1.509$$

$$A \quad \frac{(M.\ R.)^2}{W.\ W.} = \frac{100 \times 100}{100} = 100$$

$$B \quad \frac{(M.\ R.)^2}{W.\ W.} = \frac{83 \times 83}{55} = 125.254$$

The foregoing results give the poorest values obtained for the new grain herein designated B. If we take the best results obtained for the new grain designated B, we have the following:

$$A \quad \frac{M.\ R.}{W.\ W.} = \frac{100}{100} = 1$$

$$B \quad \frac{M.\ R.}{W.\ W.} = \frac{94}{61} = 1.541$$

$$A \quad \frac{(M.\ R.)^2}{W.\ W.} = \frac{100 \times 100}{100} = 100$$

$$B \quad \frac{(M.\ R.)^2}{W.\ W.} = \frac{94 \times 94}{61} = 144.852$$

It used to be customary in giving the efficiency of a grinding wheel to consider it measured by the formula $$\frac{M.\ R.}{W.\ W.}$$

However, the efficiency of a grinding wheel depends upon many factors. It may be desirable to do a certain grinding operation in a very short time and the manufacturer may be willing to pay more for the grinding materials for that given job provided the time and the labor cost is less. Numerous calculations have been made which have resulted in the agreement that where overhead is equal to 100% of direct labor, the most efficient grinding wheel is usually the one having the highest number as measured by squaring the material removed and dividing by the wheel wear. Therefore, recent formulae for quality numbers of grinding wheels involve the squaring of the material removed, and accordingly I consider that according to the foregoing test the material of this invention was 25% better than the material designated as "A", which was the best material theretofore known for the purpose, by the most unfavorable comparison, and 45% better than material "B" by the most favorable comparison. Probably no great error will be involved in splitting the difference and it may be considered that the material of the present invention is 35% better than the previous best material used for the purpose.

Certain customers and certain manufacturers estimate the quality of abrasive grain for set-up wheels by the number of articles which can be polished per wheel, that is, by the coating operations provided there is no substantial difference in the amount of time consumed for the polishing of each piece. Polishing operations are rough offhand jobs and consequently accurate data on the amount of material removed cannot be kept or would be meaningless. A number of manufacturers have tested the grain of the present invention against the abrasive which they were previously using, which in all cases was the best product theretofore known to them for the purpose.

Manufacturer A used set-up wheels for polishing shovels on three different types of shovels. Grain according to the present invention was found to be 18%, 47% and 52% better respectively than the grain the manufacturer had been using. This means that in the case of one type of shovel, 18% more shovels were polished for each setting up of the wheel; in the case of another type of shovel 47% more shovels were polished for each setting up of the wheel, and in the case of a third type of shovel 52% more shovels were polished for each setting up of the wheel. The time consumed for the polishing of each shovel was approximately the same.

Manufacturer B was polishing cast iron cones. He found the grain of the present invention 77% superior to the alumina abrasive he had previously been using which was the best he had theretofore known about. Manufacturer C was polishing forged steel golf club heads. He found the grain of the present invention 33⅓% superior to that which he had theretofore been using.

Manufacturer D was polishing bumper bars for automobiles. Using grain sizes 100, 120, 150, 180 and 220, he found grain according to the present invention was 45%, 31%, 16% and 17% respectively superior to the grain he had theretofore been using. That is to say, a greater number of bumper bars were polished for each set-up of the wheel with grain according to the present invention than with the abrasive grain theretofore used and to the extent indicated. Manufacturer E was polishing cast iron parts for looms. On the same basis as above stated, he found that grain according to the present invention was from 46% to 100% superior to that which he had been using.

Manufacturer F was smoothing the welded junctions of sheet steel pieces for refrigerator boxes. He found that when used on set-up wheels, grain according to the present invention lasts 35% longer and actually cuts faster than the grain he had theretofore been using which was a good grade of fused alumina.

Manufacturer G was polishing bumper bars for automobiles. He found that grain according to the present invention, No. 90 grit size, was 59% superior to that which he had theretofore been using, while grain according to the present invention, No. 150 grit size, was 20% superior. Furthermore, whereas there had been rejections for improper finish with previously used grain, adoption of the product of the invention resulted in practically no rejections.

Manufacturer H was buffing stainless steel spoons and flatware. Using two set-up wheels, the workmen had been able to polish three thousand knives. Using grain according to the present invention they were able to polish three thousand six hundred knives with two wheels. In another plant of the same manufacturer it was found that grain according to the present invention was from 25% to 100% superior to that which had theretofore been used.

It will thus be seen that there has been provided by this invention a product and method in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth is to be interpreted as illustrative and not in a limiting sense.

I claim:

1. A composite particle consisting of a substantial quantity of cryolite bonded to a single granule of crystalline alumina by means of heat set sodium silicate, said single granule of crystalline alumina being unbonded to any other granule of the same or other substance except said substantial quantity of cryolite.

2. A composite particle consisting of a substantial quantity of a practically insoluble fluoride bonded to a single granule of crystalline alumina by means of heat set sodium silicate, said single granule of crystalline alumina being unbonded to any other granule of the same or other substance except said substantial quantity of a practically insoluble fluoride.

3. A composite particle consisting of a substantial quantity of a practically insoluble double fluoride bonded to a single granule of crystalline alumina by means of heat set sodium silicate, said single granule of crystalline alumina being unbonded to any other granule of the same or other substance except said substantial quantity of a practically insoluble double fluoride.

4. A composite particle consisting of a substantial quantity of cryolite bonded to a single granule of crystalline alumina by means of heat set soluble silicate, said single granule of crystalline alumina being unbonded to any other granule of the same or other substance except said substantial quantity of cryolite.

ABRAHAM ALBERT KLEIN.